United States Patent [19]

McDonner et al.

[11] Patent Number: 5,355,666

[45] Date of Patent: Oct. 18, 1994

[54] HIGH WHEEL MULCHING MOWER WITH ADJUSTABLE COLLECTION CHAMBER

[75] Inventors: Orville R. McDonner, Brandon; James C. Welch, Clinton; Troy Berry, Crystal Springs; John C. Sharp, Clinton; Ricky J. Wynn, Madison, all of Miss.

[73] Assignee: Yazoo Manufacturing Company, Jackson, Mich.

[21] Appl. No.: 111,476

[22] Filed: Aug. 25, 1993

[51] Int. Cl.⁵ .................................. A01D 75/00
[52] U.S. Cl. .................................. 56/255; 56/320.2; 56/295; 56/17.4
[58] Field of Search ............... 56/17.4, 17.5, 12.8, 56/255, 295, 320.1, 320.2, DIG. 9

[56] References Cited

U.S. PATENT DOCUMENTS

| 2,663,984 | 12/1953 | Clark | 56/13.7 |
| 2,942,400 | 6/1960 | Sylvester | 56/255 |
| 3,531,923 | 10/1970 | De Lay | 56/12.8 |
| 4,135,351 | 1/1979 | Akgulian | 56/255 |
| 4,318,268 | 3/1982 | Szymanis | 56/255 |
| 4,435,949 | 3/1984 | Heismann | 56/320.2 |
| 4,890,446 | 1/1990 | Israel | 56/17.5 |
| 5,048,279 | 9/1991 | Badawey et al. | 56/320.2 |
| 5,117,616 | 6/1992 | McLane | 56/175 |
| 5,189,870 | 3/1993 | Hohnl | 56/320.2 |
| 5,195,311 | 3/1993 | Holland | 56/320.2 |

Primary Examiner—Ramon S. Britts
Assistant Examiner—Pamela Anne O'Connor
Attorney, Agent, or Firm—Penrose Lucas Albright

[57] ABSTRACT

A mulching rotary lawn mower that cuts and returns grass clippings to a lawn wherein the proportion of grass clippings that are finely cut by the rotating cutter blade can be selectively increased or decreased by provision of a collection chamber at the rear of the housing containing the rotating cutter blade, the collection chamber having a mulcher plate with a plurality of openings which can be pivoted from a substantially vertical position wherein the plate is tangential to the circle described by the cutting tips of the blade or moved rearwardly about a 45° angle, thus effectively enlarging the collection chamber while closing the openings therein, so that a greater proportion of the grass clippings cut by the blade are received in the collection chamber, but which clippings, on the average, have been cut a lesser number of times and therefore are coarser than when the plate is in the vertical position. The position of the mulching plate is controlled by a handle readily available to the operator. In the coarser mode, the clippings are less likely to clog the air flow which recirculates clippings and this mode is intended particularly for lawns which are wet or the grass has grown unusually high.

15 Claims, 8 Drawing Sheets

HIGH WHEEL MULCHING MOWER WITH ADJUSTABLE COLLECTION CHAMBER

FIELD OF THE INVENTION

This invention relates to a mulcher, and, in particular, to a mulcher that includes an apparatus and method to control the rate and degree of fineness at which clippings are returned to the lawn, and to reduce mulching problems, such as the mower choking and/or leaving clumps of grass, which arise when cutting tall or heavy wet grass and other like vegetation.

BACKGROUND OF THE INVENTION

Mulching types of rotary lawn mowers have recognized advantages compared to conventional lawn mowers. In mulching mowers, the cutting deck is essentially enclosed, except for the open bottom, by a depending skirt portion so that the mowed clippings of grass and other vegetation are not discharged generally horizontally through one side, as by conventional lawn mowers, but rather are cut into small pieces and eventually deposited on and into the lawn to become mulch. This, in effect, returns to the lawn, clippings of grass and other vegetation which have nutrients that would otherwise be lost from the lawn and should eventually be replaced or added. Further, the time consumed by the removal of bags filled with grass and other vegetation, which often eventually adds substantially to municipal landfills, is avoided by mulchers. Also avoided is the time and effort required for bagging, raking, and other cleanup operations so that the resulting saving of time and effort otherwise required for such operations is substantial. In addition, as indicated above, the cut particles are returned to the lawn where they decompose, returning nitrogen and moisture to the soil, as well as providing nutrients which fertilize the growing lawn.

Despite these advantages, mulchers have not been overly popular compared to conventional rotary lawn mowers. The primary reason is that conventional mulchers operate most efficiently when cutting only about one-third of the height of the grass, and, to be effective, the mowing and mulching operations proceed generally slower than mowing operations carried out by conventional rotary mowers. These problems are compounded when mulchers are used on wet grass. Moreover, homeowners and professional lawn care and maintenance services generally attempt to maintain schedules. But frequently, at the scheduled time for cutting a particular lawn, it may be too damp to be cut by a mulcher, whereas a conventional lawn mower may do an adequate job. Thus conventional mowers are preferred because they are more adaptable to varying lawn conditions than conventional mulchers and allow more manageable lawn care scheduling. Further, routine lawn care schedules may require that more than one-third of the height of the grass be trimmed due to interim weather conditions conducive to rapid growth of the lawn. Accordingly, there is a need for mulcher mowers which can be controlled so that they can be used to cut heavy wet grass and other vegetation of a like nature, as well as to cut more than one-third of the height of the grass whereby the mulcher operates, insofar as the operator is concerned, in much the same manner as a conventional rotary blade side or top discharge mower.

For effective fine mulching, it is considered that grass cuttings should be drawn into the blade housing and induced by the moving air caused by the rotation of the blades, to be moved more or less along a spiral path within a toroid defined by the rotating blade's housing, so that most of the grass clippings are cut at least twice and, at the same time, are being moved downwardly to be received within the lawn at the same rate that they are being cut to prevent overload conditions. Perforations provided in the blade housing may assist to achieve the desired movement of air which carries the grass cuttings and the like within the cutter blade's housing while avoiding overloads. Further, it is known that a rotary lawn mower can, in effect, be converted into a mulcher by blocking its discharge opening either with a solid plate, or a plate having perforations therein. But apparatus involved for such conversions, in general, has to be installed on the mower to provide the desired type of operation and subsequently removed to return the mower to its original mode of operations. This conversion can prove time consuming and may be difficult to accomplish under field conditions unless the mower and the conversion gear are much cleaner than is usually the situation after use.

SUMMARY OF THE INVENTION

The primary object of the instant invention is to provide a mulching mower which is highly effective and convenient for the mulching operations, but can be easily adapted for the cutting of heavy wet grass and other like vegetation without the necessity of interrupting mowing/mulching operations by the operator of the mulching mower in accordance with the invention. In effect, this is accomplished by providing a member on the periphery of the cutter housing which effectively adjusts the air flow that returns the cut grass under the blades so that the mulching operation is sufficient to pulverize, or otherwise cut the grass into small pieces to be deposited within the lawn, and the speed the mower travels for the mowing/mulching operation need not unduly slow and preferably a speed normal for mowing operations. For heavier growths of grass, particularly grass which may be wetter or taller than desired, the mulcher, in accordance with the invention, provides for coarse mulching of the grass or other vegetation while continuing to travel at the same, or about the same, speed normal for mowing operations. Further, clippings are guided in the mulching operation to a collection space in the cutting housing disposed at the rear of the circle defined by the outer rotating tips of the cutting blades to be received in the lawn in a relatively even and uniform fashion. This space, which is shown in the disclosed embodiment, but is not necessarily, disposed at the rear of the cutting blades may be considered an adjustable or expansible collection chamber which prevents the housing from being overloaded during mulching operations irrespective of whether the condition of the lawn is suitable for normal mulching operations or is overly damp or too high for normal mulching. The adjustment to the collection chamber thus permits a mulcher, in accordance with the invention, to be used by operators in a manner similar to that of conventional lawn mowers without encountering the disadvantages incident thereto as discussed above.

Further objects, adaptabilities and capabilities of the invention will be appreciated by those having expertise in the art, as professional operators or manufacturers of lawn mowers and mulchers and/or those who have made thorough studies and evaluations of same, as the

DESCRIPTION OF THE PREFERRED EMBODIMENT

Figure 1:
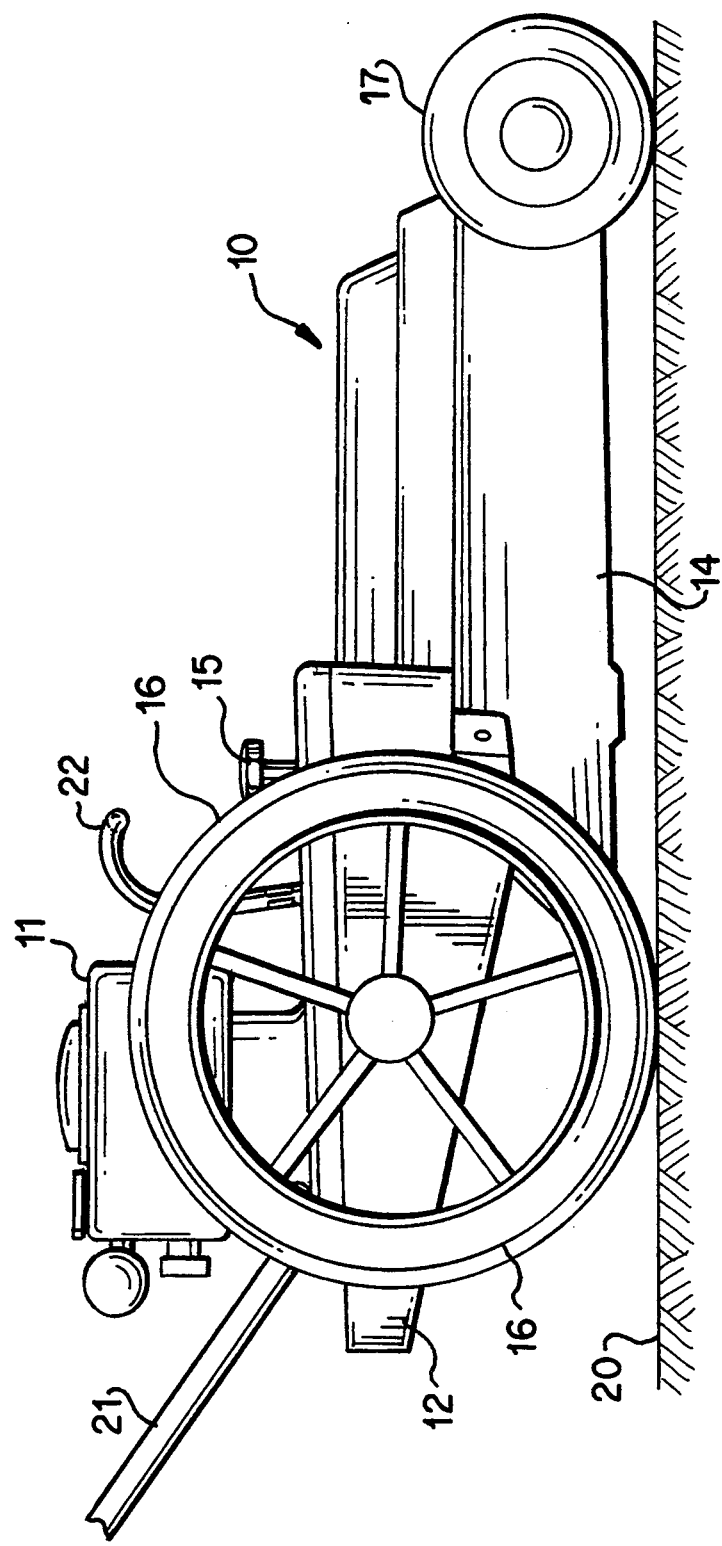
FIG. 1 is a partially diagrammatic side elevational view of a high wheel mulching mower in accordance with the invention.

FIG. 1 is a side elevation view, partially diagrammatic, of a mulching mower in accordance with the invention, which is referred to generally herein by reference numeral 10. Mulching mower 10 is a high wheel type mulching mower, powered by five horsepower internal combustion engine 11 which is supported by and secured on a rear deck 12. The latter is rigidly connected to a forward cutter deck 14. Mulching mower 10 includes a cutting height adjustment system controlled by a single knob 15 that simultaneously raises or lowers the mower's rear supporting wheels 16 and forward ground engaging wheels 17 relative to decks 12 and 14, to adjust the clearance of the cutter deck 14 relative to the underlying ground or lawn 20. Rear supporting wheels 16 have large sixteen inch diameter pneumatic tires mounted thereon to provide improved handling and a smoother cut over rough terrain. The rims of wheels 16 are preferably molded. Forward wheels 17 are preferably high density plastic or steel with ball bearings and mounted on mower 10 by shoulder bolts.

Engine 11 is preferably a five horsepower Briggs & Stratton Quantum internal combustion engine having an auxiliary PTO shaft for selectively engaging a chain, sprocket and axle drive train connected to the hub of wheel 16 with a positive ratchet and pin drive providing a positive traction differential drive system. A traction drive clutch is included to provide, when engaged, a positive chain drive to the rear wheels 16 for the purpose of preventing slippage in wet conditions.

Mower 10 includes a handle 21 for the operator which has the usual mower controls thereon (not shown).

Figure 2A:
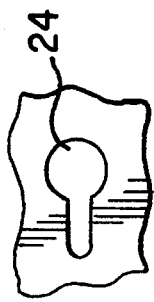
FIG. 2A is a plan view of the keyhole configured opening in the top of the rear deck shown in FIG. 2 for receiving the control rod for the mulching plate.
Figure 2:
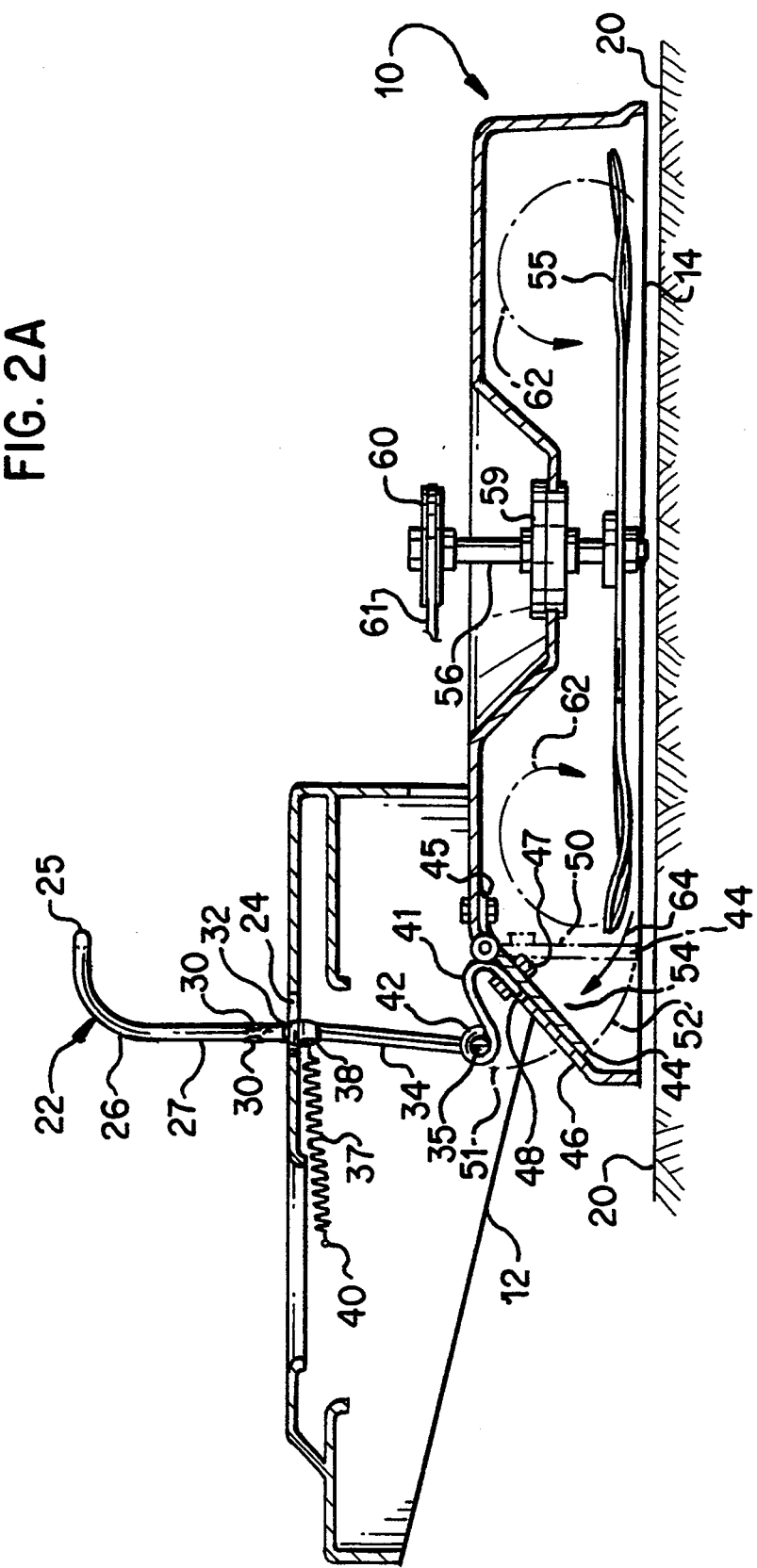
FIG. 2 is a partially diagrammatic side elevational sectional view of the mower's cutter deck and the rear deck connected thereto.
Figure 3:
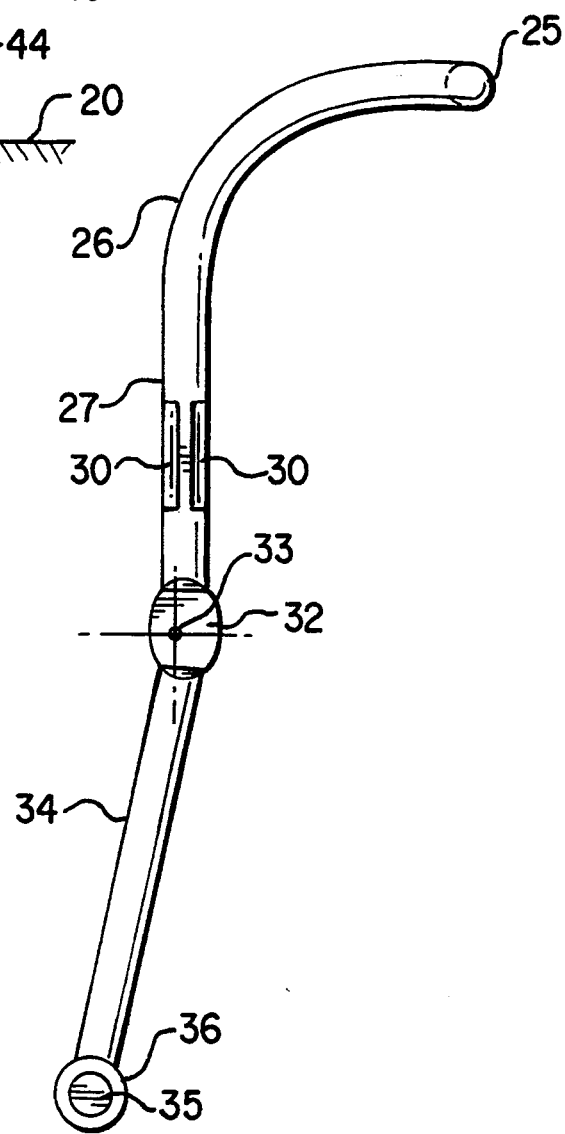
FIG. 3 is a side elevational view of the mulcher plate control rod in accordance with the invention.
Figure 4:
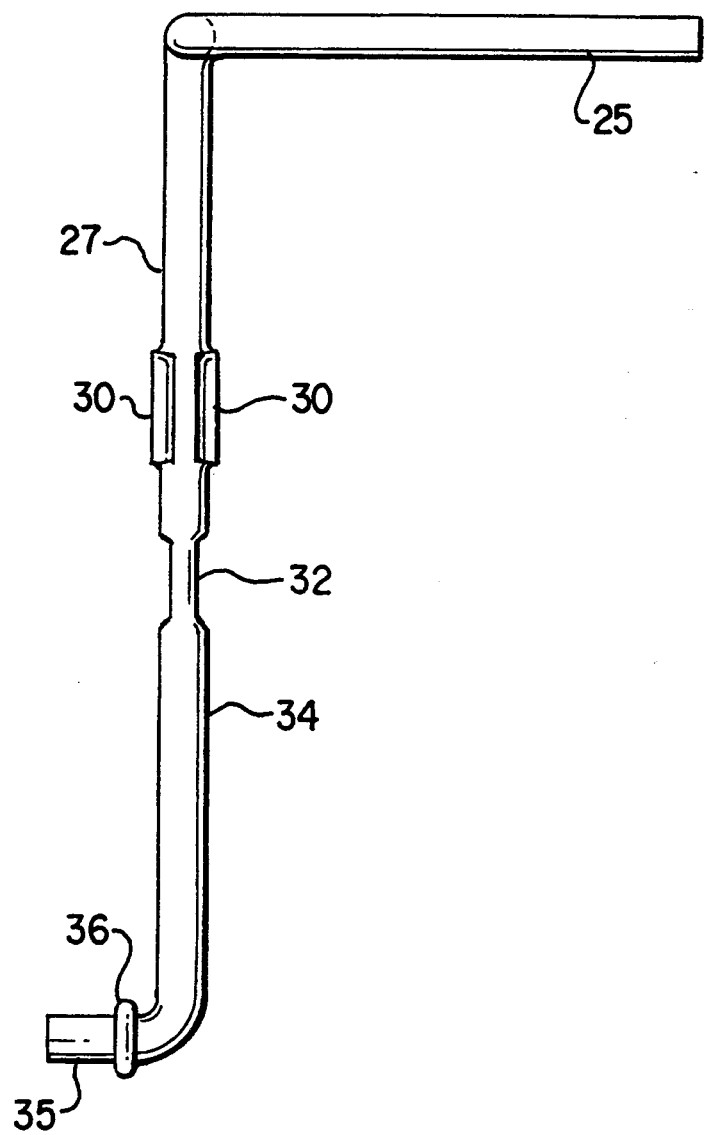
FIG. 4 is a front elevational view of the rod shown in FIG. 3.

As illustrated in more detail in FIGS. 2, 3 and 4, the top of rear deck 12 receives forward of engine 11 a mulching plate control rod 22 through an opening 24 having a keyhole configuration as seen in plan in FIG. 2A. The larger forward part of opening 24 has a diameter of 0,625 inches, whereas the 180° arc of the rearwardly extending slot has a radius of 0.196 inches with ½ inch being provided between the center lines for the forward portion of the opening and the rearwardly disposed radius.

Rod 22 includes a horizontal handle 25 which is connected by an arcuate portion 26 to a vertical part 27 on which a pair of stop plates 30 are rigidly secured or are formed integral therewith. Under stops 30, a pinched area 32 is formed in the rod from which depends a lower rod portion 34. Lower portion 34 merges into a horizontal journal part 35 and a circular flange portion 36.

Pinched area 32 is provided with a bore 33 to which is connected a tension spring 37. It will be seen that tension spring 37 is connected to bore 33 on its rearward end and to rear deck 12 via an aperture 40 therein, or via any other suitable means for attaching the rear end of spring 37 to rear deck 12 so it is retained in tension. A resilient steel control lever member 41 has on its rearward portion a loop 42 that is firmly connected to journal part 35. The forward end of the lever member 41 is received by, and forms part of, a hinge 45. Lever member 41 is firmly secured to a mulching plate 44 by a nut and bolt set 47 or other suitable securing means. Nut and bolt set 47 on its upper portion is secured to lever bar 41, and extends through an opening 48 provided for that purpose in the after wall 46 of cutter deck 14.

Figure 2B:
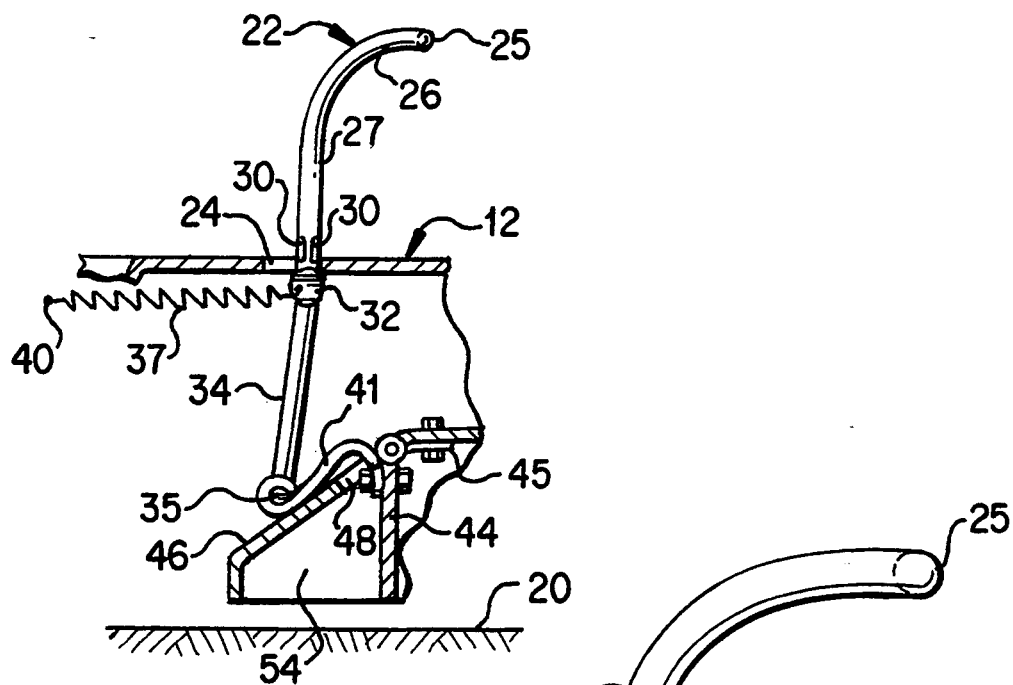
FIG. 2B is a sectional view illustration of the control rod in its forward position for fine mulching operations.
Figure 6:
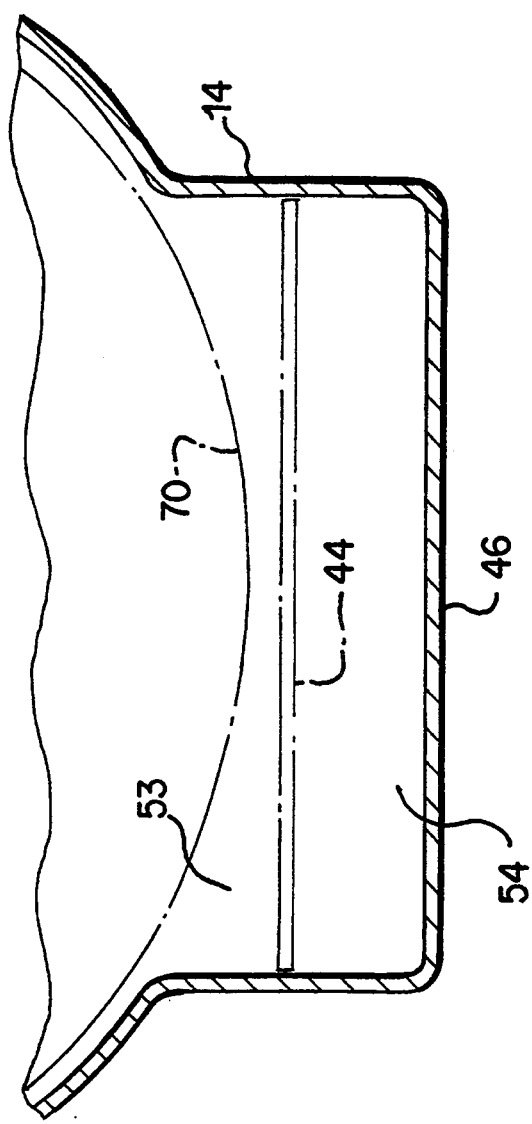
FIG. 6 is a sectional plan view of the rear portion of the cutter deck which illustrates the adjustable collection chamber forward of the rear wall.

When an operator moves control rod 22 forward and downwardly so that it is received in the larger forward part of opening 24, control lever member 41 is pivoted downwardly about hinge 45 to displace mulching plate 44 from its position, as shown in FIG. 2, wherein it is disposed at approximately 45° relative to lawn 20, to a vertical disposition as shown by dot dash lines 50. Dot dash lines 51 indicate the arcuate movement of control lever member 41, and dot dash lines 52 depict the arcuate movement of the plate 44 from its initial rear position wherein it is disposed at about 45° relative to ground 20 and against after wall 46 to its forward position shown at dot dash lines 50, wherein it is disposed at about 90° relative to lawn 20. The horizontally disposed space formed between wall 46 and mulching plate 44, when in the position indicated by reference numeral 50, comprises a clipping diversion space 54. Space 54, as enlarged to include a space 53, as seen in FIG. 6, comprises an adjustable collection distribution chamber which functions to prevent overload or choking conditions which could otherwise occur in mulcher 10 when operated. FIG. 2B also shows the clipping diversion space 54 between the downwardly extending mulcher plate 44 and the rear wall 46 when plate 44 is perpendicular to ground 20.

It will be noted that FIG. 2 also discloses the cutter blade 55 of mower 10 which is rigidly connected to a cutter spindle 56 mounted in a cutter spindle bearing support housing 57. Spindle 56 has rigidly secured thereto in its upper aspect a cutter pulley 60, which is connected via a drive belt 61 to the drive pulley of engine 11, the belt 61 being maintained taut by an idler pulley (not shown) mounted to bear resiliently against belt 61 in rear deck 12. Such drive means for cutter blade 55 is generally conventional and therefore not described in detail. However, for most operations, the drive pulley of engine 11, as well as cutter blade 55, rotate at 3,150 rpm plus or minus 100 rpm. The vertical sides or skirt of cutter deck 14 generally conform to the surface of a cylinder, except in the rear where it accommodates the mulcher plate 44 and defines space 53 and, as enlarged, space 54.

Blade 55 cuts a width of twenty-two inches in the embodiment involved, and induces, in the housing formed by cutter deck 14, a generally spiral movement of air carrying cut grass and other vegetation, as indicated by dot dash arrows 62 which spiral within the toroid defined by the cutter deck housing 14 and the underlying lawn. Clippings received in space 53 and otherwise into lawn 20 avoid the receipt of an overload of clippings and other cut material in the housing defined by cutter deck 14. Clippings not received between the grass blades of a lawn are more likely to be displaced by the partial vacuum created under blade 55 and subjected to further shearing action. When mulcher plate 44 is retracted as shown in FIG. 2, then a greater portion of the air flow is diverted to and received within space 53 as extended by the clippings diversion space 54. In this position, the grass clippings received on lawn 20 are, on the average, coarser. Nevertheless, most of the clippings received in the enlarged space 53/54 have been cut at least twice. They collect generally uniformly on and within lawn 20 within space 53 as extended by space 54 to form a more or less uniform strip having a width of between twelve and thirteen inches. Of course, other clippings are injected into the lawn along the entire width of deck 14 so that the width of the strip is, in fact, about twenty-three inches in diameter in this embodiment. However, with more clippings than usual being received in space 53/54, the clippings tend to be generally evenly distributed within and on the lawn, and clumping is avoided.

Figure 5:
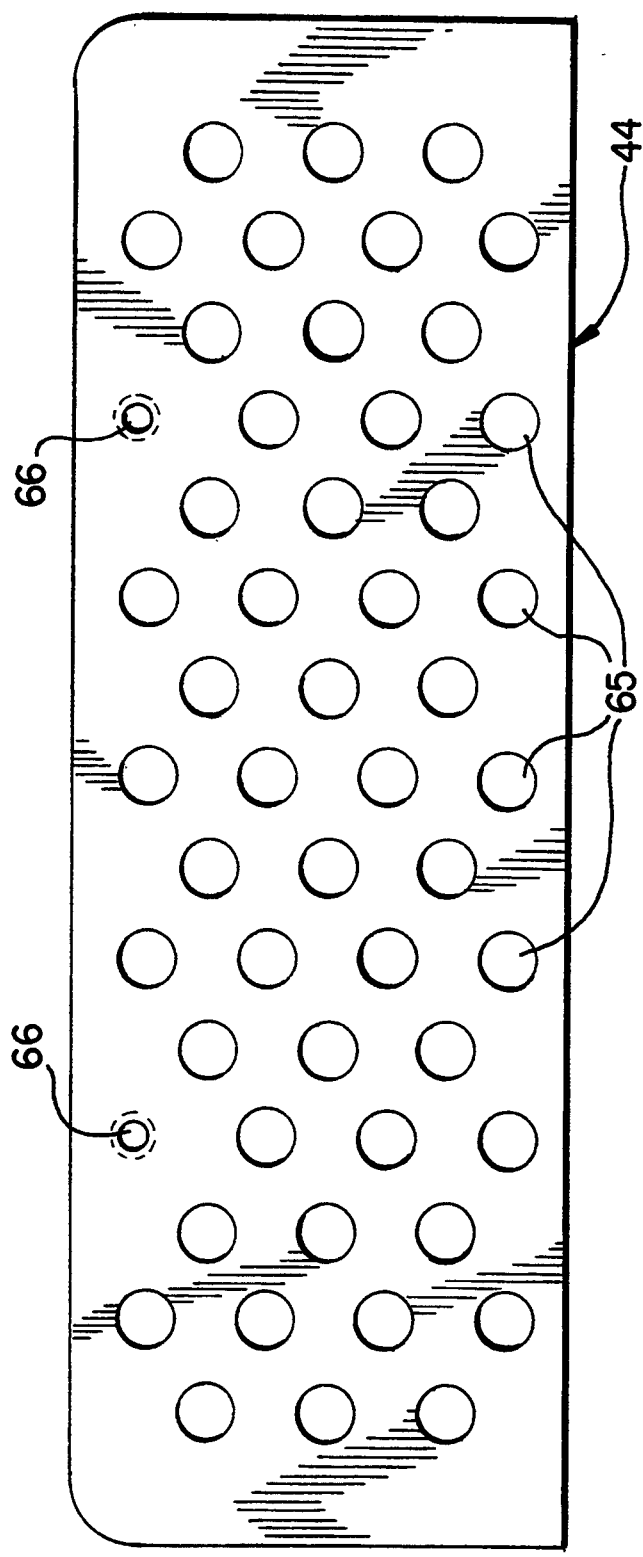
FIG. 5 is a front elevational view of a mulching plate in accordance with the invention.

FIG. 5 depicts mulcher plate 44, which contains a plurality of (about fifty) circular openings 65, each having a diameter of one-half inch, which, it has been found in practice, do not become clogged by grass clippings or other vegetation, except under severely wet or otherwise extreme conditions. Openings 65 function when mulcher plate 44 is in a vertical position, as shown in FIG. 2B, to disrupt, in part, the spiral flow of air that carries clippings 62 the housing defined by deck 14, while permitting a sufficient portion of the clippings to be recycled through a blade 55 to ensure that most of the clippings are cut several times to produce finely divided cut grass clippings for receipt and incorporation into lawn 20. Mulcher plate 44 also has a pair of extruded holes 66 that receive bolts 47 for firmly and rigidly securing control lever member 41 to mulcher plate 44.

In FIG. 6, it will be seen that the tips of the cutter blade 55 circumscribe a circle indicated in dot-dash lines and designated by reference numeral 70. Mulcher plate 44 is also shown in dot dash lines in its vertical position. It will be appreciated that the space behind the circle 70 comprises a first space 53, which is arcuate on its forward side and defined by plate 44 at its rear. If plate 44 is moved to the rear as shown in FIG. 2, then space 53 is expanded to extend into the diversion space 54. Space 53, with plate 44, in a vertical position as shown in FIG. 2B, is considered to be the collection chamber which is adjustably expansible to include space 54 when plate 44 is raised to the position shown in FIG. 2. For fine mulching, the collection chamber, comprising an unexpanded space 53 within cutting deck 14, prevents a load-up of clippings during operations within and under deck 14. For coarse mulching operations, space 54 is combined with space 53 to define an enlarged collection chamber 53/54 which, in operations, again has been found sufficient to prevent an overload of clipped grass (which may be wetter and/or longer than generally considered favorable for mulching) within the housing defined by cutter deck 14, and, at the same time, to permit the mower 10 to be operated at travel speeds which approach, or are essentially the same as, those which would be used by a conventional mower having a comparable size of cutting blade. In other words, the collection chamber, whether simply space 53 or combined spaces 53 and 54, contributes to and increases the efficiency of the mower 10 so that it can be operated both under conditions which are recognized as favorable to mulching and, in any event, under conditions which are much less favorable to a mulching operations, but wherein a conventional lawn mower could be used if necessary, or if required. Moreover, for both types of lawn conditions, mower 10 operates insofar as its travel speed is concerned about the same as a conventional mower of the same size and capacity.

Figure 7:
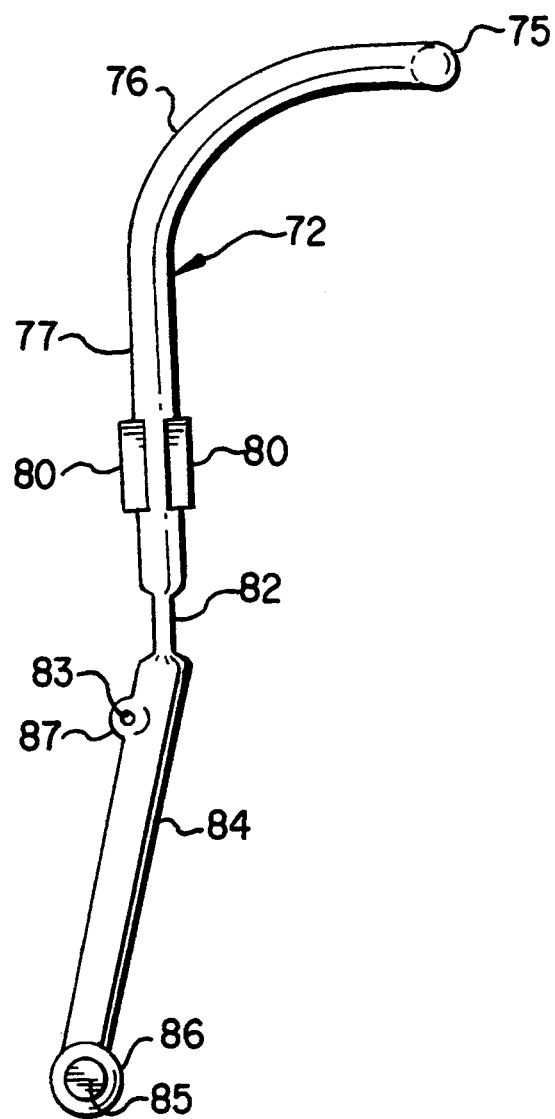
FIG. 7 is a side elevational view of a further embodiment of the mulcher plate control rod in accordance with the invention.
Figure 8:
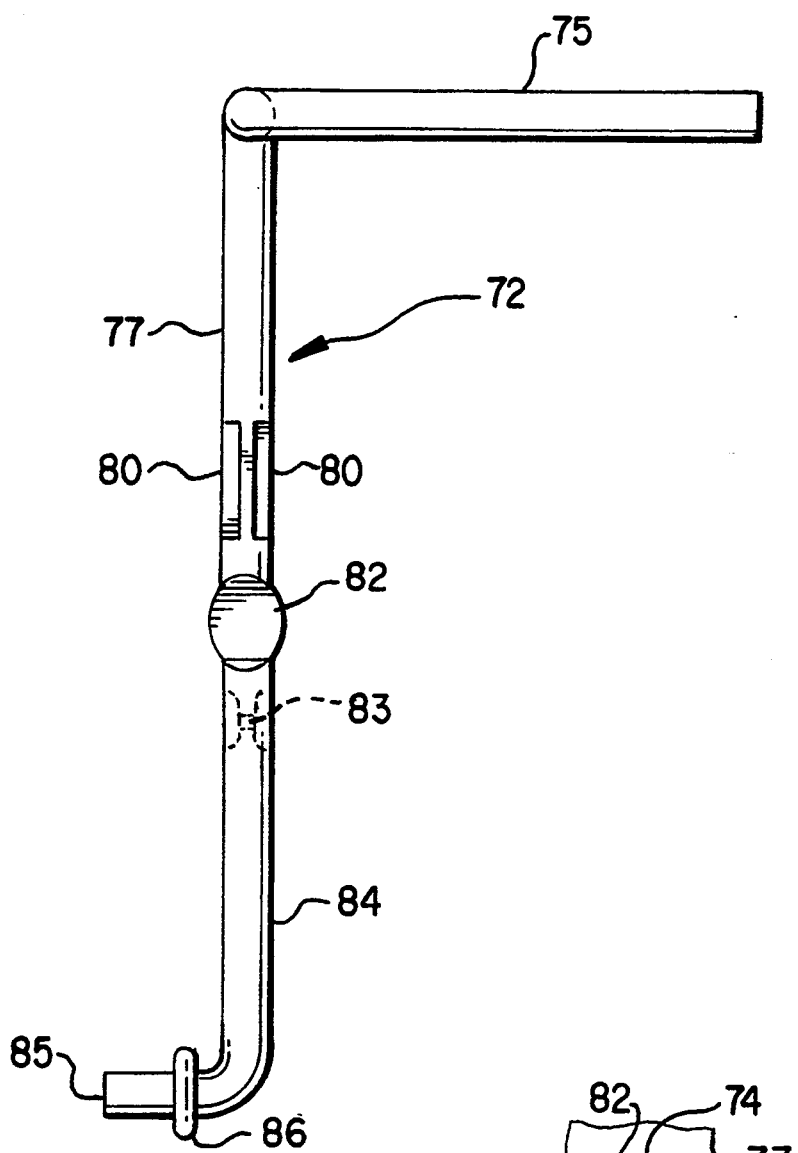
FIG. 8 is a front elevational view of the rod shown in FIG. 7.

A further embodiment of the control rod is shown in FIGS. 7 and 8. The control rod here is designated generally by reference numeral 72 and is similar to the control rod shown in FIGS. 3 and 4, except that the pinched flat area, designated by reference numeral 32 in FIGS. 3 and 4 is displaced about an upwardly extending axis by 90° so that it is transverse, not parallel, such as pinched area 32, to the usual direction of travel of mower 10. This is also true relative to the stop members 30 in FIGS. 3 and 4, and 80 in FIGS. 7 and 8. It will be appreciated that the control rod 72 may be substituted in mower 10 for the control rod 22, and pinched portion 82 is disposed somewhat lower than the pinched area 32.

Referring to FIGS. 7 and 8, it is to be seen that control rod 72 comprises a handle 75 that extends horizontally and transversely to the usual direction of travel of mower 10 which can be easily grasped and manipulated by an operator of the mower. Handle 75 is connected to a curved portion 76 of rod 72 which merges into the upper part 77 of rod 72, wherein the stop members 80 have been formed. Disposed downwardly from stop members 80 is a pinched portion 82 which separates and rigidly connects the upper part 77 to a lower part 84 of rod 72. Lower part 84 is bent at its lowermost aspect to extend transversely in a direction opposite to handle 75, but with its longitudinal axis extending parallel thereto, wherein a circular flange 86 is formed. Outboard of flange 86 is a horizontal journal 85 which is adapted to receive loop 42 of control lever member 41. Under the pinched portion 82, in the after side of lower part 84, a protuberance 87 is formed which has a horizontal hole 83 therethrough- Hole 83 is adapted to receive tension spring 37 so that when the control rod 72 is received through the key hole configured opening or aperture 74 and journal 85 is received in loop 42, control rod 72 is urged to the rear by the tension spring 37. Control rod 72 is preferably formed from a single piece of steel rod which is appropriately coated to resist rust and corrosion and wherein stop members 80, pinched portion 82, protuberance 87 together with hole 83, circular flange 86, and horizontal journal 85, are fabricated therein in the manufacturing process.

In operation of mower 10, the operator turns the cutting height adjustment knob 15 to adjust the cutting height in this embodiment to a desired height between about one inch and about 3½ inches above lawn 20. If the condition of the grass is such that fine mulching of lawn 20 can be achieved without undue difficulty, the control rod 22 is pushed forward by the operator via control handle 25, and downwardly so that stops 30 abut against, or are proximate to, the top of rear deck 12, and hence control lever member 41 is moved downwardly so that loop 42 thereof abuts against, or is closely proximate to, wall 46, and plate 44 is disposed in a vertical position relative to lawn 40 as shown in FIG. 2B and by dot-dash lines in FIG. 6. The fuel tank of engine 11 is filled with unleaded regular gasoline. Engine 11 is then started, and a traction drive clutch (not shown), which provides positive chain drive to the rear wheels 16, is engaged to commence the mowing-/mulching operation.

The grass is cut by the revolving blade 55, which causes an air flow that carries the cut grass in a direction illustrated by arrows 62. As a general proposition, the grass clippings are recirculated in a generally spiral path within a toroid defined by the housing of cutter deck 14, and each clipping is usually cut at least twice or more, whereby the clippings are sufficiently finely pulverized so that they are received within, rather than on top of, lawn 20 wherein they subsequently decompose and add nutrients to the lawn. Plate 44, being in the position shown in FIG. 2B, diverts a portion of the air flow through circular openings 65 therein, but still generally acts to confine the movement of air, clippings and other cut material to be retained in the space forward thereof as mower 10 moves forwardly. A portion of the clippings, however, are received in space 53 and generally within the underlying lawn 20. Clippings that are not sufficiently small, if received on the lawn, do not penetrate into the lawn. They are therefore lifted by the pressure gradient of the partial vacuum created by the rotating blade 55, to be cut as they are recirculated by the air flow created within deck 14 so that they will be received into lawn 20 in a finely divided form.

If the operator, at the commencement of the mowing operation or during the mowing operation, decides that the operation will proceed more favorably if the mulching is coarser, he grasps handle 25 of mulcher plate control rod 22, moving same forwardly and upwardly so that the pinched area 32 is received within the rear thinner portion of the keyhole configured opening 24, thereby moving plate 44 to the rearward position as shown in FIG. 2, whereby it is raised from lawn 20 and disposed at approximately a 45° angle thereto and bearing against, or closely proximate to, wall 46. Control rod is then held frictionally in the position shown in FIG. 2. This provides an escape for the cut clippings into space 53 as enlarged by the clipping diversion space 54, so that a substantial portion of the clippings are diverted from above circle 70 defined by rotation of cutter blade 55 within cutter deck 14, and the mowing-/mulching operation can then proceed at a much more rapid pace, albeit the clippings received in space 53/54 are not pulverized or cut finely to the same extent as occurs when control rod 22 is set for the fine mulching operation as shown in FIG. 2B. Nevertheless, significant mulching still takes place even though the mower/mulcher 10 is now operating more nearly as a conventional mower.

Figure 9:
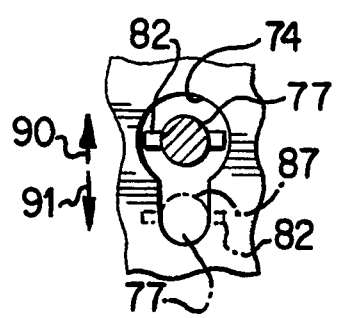
FIG. 9 is a plan view of the key hole opening in the top of the rear deck for receiving the control rod shown in FIGS. 7 and 8 with positions of the control rod received in the opening illustrated in the figure.

With the control rod shown in FIGS. 7 and 8, the mulching plate 44 is in its vertical or fine mulching position, as shown in FIG. 2B, when the pinched portion 82 is disposed under the key hole aperture 74. It is in its coarse mulching position, that is, disposed at 45° to the underlying ground, as shown in FIG. 2, when the pinched portion 82 is above the key hole aperture 74. Thus, when an operator desires to shift the mulching operation from fine to coarse, with the upper part 77 of rod 72 in a position shown in dot-dash lines in FIG. 9, wherein the pinched portion 82 lies under and adjacent to the underlying surface of the plate in deck 12 that defines key hole aperture 74, rod 72 is first moved forward by handle 75 in direction 90 to the position as shown in solid lines, then lifted so that pinched portion 82 is now disposed above the upper surface of the surrounding plate in deck 12 that defines key hole aperture 74, and next rod 72 is moved to the rear in direction 91, again to the position shown at dot-dash lines in FIG. 9, except that the bottom surfaces of the wings of pinched portion 82 are now disposed above the key hole aperture 79 so that they bear on the upper surface of the plate in deck 12 defining same. To readjust the rod 72 so that the mulching plate 44 is returned to the vertical disposition for fine mulching, rod 72 is first moved in the direction of arrow 90, next moved downwardly by handle 75, and then moved rearwardly in the direction of arrow 91, whereby the upper surfaces of the wings of pinched portion 86 bear against the underlying surface of the plate of deck 12 defining key hole aperture 74. Tension spring 37 retains the rod 72 in the smaller width of the key hole aperture 74 whether in the coarse or fine mulching position. The size and disposition of the pinched portion 72 is such that when it bears against the lower surface of deck 12, the lower part 84 of rod 72 is slightly in compression, whereas when in position for coarser mulching as shown in FIG. 2, the lower part 84 is slightly in tension. Thus, the deck 12 surrounding the key hole aperture 74 is resiliently urged against either the upper or lower portions of the wings of pinched portion 82 to assist, together with tension spring 37, in retaining rod 72 in its disposition for both coarse and fine mulching. The force of the engagement between the pinched portion 72 and the upper deck 12 is not, however, sufficient to cause undue wear. Nevertheless, a provision can be made in the area where the engagement occurs for the application of additional coating material both on the engaging upper and lower edges of pinched portion 82 and the engaging portions of deck 12 to ensure that, over the expected lifetime of the mower, bare metal will not be exposed due to the frictional wear that occurs. Also, it will be appreciated by one skilled in the art that the control lever member 41 may be composed of a resilient metal whereby both in the fine and coarse mulching positions, it cooperates with tension spring 37 to retain rod 72 in the narrower part of key hole aperture 74. This is advantageous in that it permits the mower parts to be manufactured, at least insofar as the rod 72 and deck 12 are concerned, with less exacting tolerances than would otherwise be required. Also, it is less likely that the operator, in maneuvering rod 72 via control handle 75, may cause undue wear on those parts of pinched portions 82 which engage the upper and lower surfaces of deck 12 surrounding key hole aperture 74.

The simplicity of the operation and the provision of the collection chamber defined by space 53 and as adjustably enlarged to include space 54 are important to the operations both because of their simplicity and effectiveness.

It will be appreciated that the foregoing detailed description has been provided for clearness of understanding only, and no unnecessary limitation should be understood therefrom. Many modifications, such as the size of the various components, including the mower/mulcher, as such, will be obvious to those skilled in the art after review of the foregoing specification. The invention is defined by the following claims:

It is claimed:

1. A mulching rotary lawn mower which cuts and returns cut grass clippings to a lawn, the mower comprising:
   an engine;
   a rotating blade driven by said engine, said blade adapted to cut grass and create a partial vacuum between said grass and said blade; and
   a cutter deck which rotatable mounts said blade in a substantially horizontal disposition, said cutter deck including a skirt which closely surrounds the circle circumscribed by said blade, except for a collection chamber included in said skirt which is disposed at the rear of said cutter deck, said cutter deck directing air flow caused by said rotating blade when driven by said motor so that grass in the underlying lawn is cut by said blade and the clippings therefrom are moved by said air flow within said deck to, at least in part, said collection chamber, and adjustment means for said collection chamber, wherein said adjustment means comprises a plate which is movable within said collection chamber for the selective enlargement or reduction in volume of said collection chamber, for adjusting the portion of said clippings received therein to avoid overloading said cutting deck by cut grass and clippings being moved therein by said air flow.

2. A mulching rotary lawn mower in accordance with claim 1, wherein said adjustment means comprises control means connected to said plate for raising said plate relative to the remainder of said skirt to enlarge said collection chamber.

3. A mulching rotary lawn mower in accordance with claim 1, wherein said plate defines a plurality of openings therethrough.

4. A mulching rotary lawn mower in accordance with claim 2, wherein said control means comprises a movable member which extends to a location on the mower which can be readily manipulated by an operator of said mower for selective adjustment of the volume of said collection chamber.

5. A mulching rotary lawn mower in accordance with claim 2, wherein hinge means is provided that pivotally connects said plate to the remainder of said skirt.

6. A rotary lawn mower for cutting and mulching grass on a lawn, said mower comprising:
   an engine;
   a rotating blade driven by said engine, said blade comprising a substantially horizontal portion and an angled portion at each end of said horizontal portion;
   a deck which supports said engine, said deck comprising a housing having a circumferential skirt, said blade rotatably mounted beneath said housing and surrounded by said skirt, said housing being open at its bottom to permit said blade to cut the underlying grass, the rotation of said blade producing a partial vacuum under said deck and an air flow to carry cut grass within said housing;
   a collection chamber in said housing adjacent to said rotating blade, said housing including a plate which is adjustably pivotable about to a horizontal axis for enlarging said collection chamber, said plate having a plurality of openings therein for some of the air from said air flow to move outwardly relative to the axis of rotation of said rotating blade in said housing, and said plate guiding a further part of the grass clippings to be recirculated into said partial vacuum space or to be received in the underlying lawn, said plate being selectably moveable about said horizontal axis to expand said collection chamber and close said openings so that an increased portion of the grass clippings are returned to said lawn relative to the clippings received in said partial vacuum space which are again cut before being carried by said air flow to be received in said collection chamber.

7. A rotary lawn mower in accordance with claim 6, wherein said collection chamber is disposed to the rear of said rotating blade considered in the usual direction of travel of the mower when being operated.

8. A rotary lawn mower in accordance with claim 7, comprising a control rod for adjusting the disposition of said plate, whereby said plate is in a substantially vertical position for fine mulching of said grass clippings and is pivoted to the rear for closing said openings and the coarse mulching of said grass clippings.

9. A mulching rotary lawn mower which cuts and returns cut grass clippings to lawn, mower comprising:
   engine means for rotating a horizontally disposed cutting blade means, said blade means performing the functions of cutting grass, creating a partial vacuum between said grass and said blade means, and producing an air flow for moving cut grass clippings within a housing of the mower;
   said housing means mounting said blade means in a substantially horizontal disposition above said grass, and housing means including skirt means closely surrounding the circle circumscribed by said blade means and collection chamber means at the rear of said housing means, said skirt mens and said collection chamber means directing said air flow within said housing means so that a substantial portion of said clippings carried by said air flow are cut by said blade means more than once, said collection chamber means being adjustably expansible for selectively adjusting the relative portion of said air flow and said clippings received therein, whereby said collection chamber means comprises plate means which is moveable within said collection chamber means for selectively enlarging or reducing the volume thereof; and
   said air flow recirculates a lesser portion of said clippings to be further cut by said blade means and the relative portion of said clippings which are not finely cut by said blade means is increased.

10. A mulching rotary lawn mower in accordance with claim 9, wherein said plate means includes a plurality of openings for receiving a portion of said air flow, said openings being unblocked when said plate means is in a first position that reduces the volume of said collection chamber means and said openings being substantially blocked when said plate means is in a second position that enlarges the volume of said collection chamber means.

11. A mulching rotary lawn mower in accordance with claim 10, comprising adjustment means operatively associated with said plate means for raising said plate means in said housing means and enlarging said collection chamber means.

12. A mulching rotary lawn mower in accordance with claim 11, wherein said adjustment means comprises control means for selectively changing the volume of said collection chamber means by moving said plate means between said first and second positions whereby in the second of said positions, said collection chamber means is enlarged, and in the first of said positions, the volume of said collection chamber means is reduced.

13. A mulching rotary lawn mower in accordance with claim 12, wherein said control means comprises moveable means that extends to a location on the mower which can be readily manipulated by an operator of the mower for selectively adjusting the volume of said collection chamber means.

14. A method of mowing a lawn wherein the grass clippings may be selectively finely of coarsely mulched, the method comprising:
creating a partial vacuum between the grass of said lawn and blade of a lawn mower rotating above said lawn by causing the air between said grass under said blade to flow upwardly above said blade;
carrying grass clippings cut by said blade in said air flow;
directing said air flow and said clippings carried therein in a generally spiral movement confined generally in a toroid configured volume to move most of said clippings so they are cut more than once by said blade;
providing a collection chamber for said air flow to divert therefrom a portion of said air flow and said clippings from above said blade to prevent clogging of the air flow by said clippings; and
selectively adjusting said collection chamber's space, wherein the adjusting means comprises a plate which is movable within said collection chamber for the selective enlargement or reduction in volume of said collection chamber, thereby the said collection chamber receives a larger portion of said clippings and air flow to prevent clogging thereof which would otherwise occur due to an increase in the volume and/or weight of the clippings being moved by said air flow.

15. A method in accordance with claim 14, including the selective steps of adjusting the volume of said collection chamber's space to make it smaller so that the number of times said clippings are cut is increased to provide a fine mulching, and enlarging said collection chamber's space to reduce the number of times the clippings are cut so that coarser clippings are produced.

* * * * *